(12) United States Patent
Taniguchi et al.

(10) Patent No.: US 7,727,664 B2
(45) Date of Patent: Jun. 1, 2010

(54) PRODUCTION METHOD FOR FUEL CELL

(75) Inventors: Takumi Taniguchi, Susono (JP); Masafumi Kobayashi, Sapporo (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 801 days.

(21) Appl. No.: 11/597,134

(22) PCT Filed: Jul. 12, 2005

(86) PCT No.: PCT/IB2005/001974

§ 371 (c)(1),
(2), (4) Date: Nov. 20, 2006

(87) PCT Pub. No.: WO2006/008615

PCT Pub. Date: Jan. 26, 2006

(65) Prior Publication Data

US 2008/0128948 A1    Jun. 5, 2008

(30) Foreign Application Priority Data

Jul. 13, 2004    (JP) .............................. 2004-205936

(51) Int. Cl.
*H01M 4/00* (2006.01)
(52) U.S. Cl. ..................... 429/41; 429/27; 429/28; 429/29; 429/40
(58) Field of Classification Search .................. None
See application file for complete search history.

(56) References Cited

U.S. PATENT DOCUMENTS

| | | | | |
|---|---|---|---|---|
| 4,410,607 A | * | 10/1983 | Arons et al. ................. | 429/40 |
| 4,411,968 A | * | 10/1983 | Reiser et al. ................. | 429/41 |
| 4,542,079 A | * | 9/1985 | Takeuchi et al. ............. | 429/39 |
| 4,548,876 A | * | 10/1985 | Bregoli ........................ | 429/39 |
| 6,103,078 A | | 8/2000 | Hitchems et al. | |
| 6,110,333 A | | 8/2000 | Spethmann et al. | |
| 2005/0181285 A1 | | 8/2005 | Sakamoto et al. | |

FOREIGN PATENT DOCUMENTS

| | | |
|---|---|---|
| EP | 1 296 398 A2 | 3/2003 |
| JP | A 6-176771 | 6/1994 |
| JP | A 2000-285932 | 10/2000 |
| JP | A 2004-47489 | 2/2004 |
| WO | WO 2004/051776 A1 | 6/2004 |

* cited by examiner

*Primary Examiner*—Patrick Ryan
*Assistant Examiner*—Cynthia Lee
(74) *Attorney, Agent, or Firm*—Oliff & Berridge, PLC

(57) ABSTRACT

A production method for a fuel cell including an electrolyte, an anode which is provided on one of both sides of the electrolyte, a cathode which is provided on the other side of the electrolyte, and separators one of which is provided on an outer side of the anode and the other of which is provided on an outer side of the cathode. This production method includes a first process in which the anode and the cathode each of which includes at least a catalyst and an ion-exchange resin are produced; and a second process in which the electrolyte is provided between the anode and the cathode before being formed into a thin-film electrolyte. With this production method, contact resistance can be reduced without increasing the number of production processes.

5 Claims, 4 Drawing Sheets

US 7,727,664 B2

PRODUCTION METHOD FOR FUEL CELL

The disclosure of Japanese Patent Application No. 2004-205936 filed on Jul. 13, 2004, including the specification, drawings and abstract is incorporated herein by reference in its entirety.

BACKGROUND OF THE INVENTION

1. Field of the Invention

The invention relates to a production method for a fuel cell. More particularly, the invention relates to a production method for a fuel cell, which makes it possible to produce a fuel cell with reduced contact resistance.

2. Description of the Related Art

Among various types of fuel cells, great attention has been given to a polymer electrolyte fuel cell (hereinafter referred to as a "PEFC"), as the optimum power source for an electric vehicle. This is because the PEFC can be operated at a rather low temperature, and exhibits high energy conversion efficiency of 50% to 60%. Also, a start-up time of the PEFC is short, and a system of the PEFC is compact and light-weight. For an electrolyte of the PEFC, a cation-exchange resin membrane is used. The cation-exchange resin membrane is used as a cation conductive membrane. The cation conductive membrane of the PEFC has a proton (hydrogen ion (H+)) exchange group in a molecule. When being moisturized to saturation, the cation conductive membrane exhibits specific resistance of equal to or lower than 20 Ωcm, and serves as a proton conductive electrolyte. The saturated moisture content of the electrolyte membrane reversibly changes based on a temperature. Namely, when the PEFC is being operated, the electrolyte membrane is kept saturated with moisturizing water that is supplied, in the form of water vapor, to fuel gas and oxidizing gas in order to prevent a moisture loss from the electrolyte membrane, and with water that is generated by an electrochemical reaction which occurs on the cathode side.

The PEFC mainly includes an electrolyte membrane, a fuel electrode (hereinafter, referred to as an "anode"), an air electrode (hereinafter, referred to as a "cathode"), and separators. Such a PEFC is usually formed by the following method. First, the cathode is joined to one of both surfaces of the electrolyte membrane, which is formed to be a thin-film in advance, and the anode is joined to the other surface, whereby a membrane electrode assembly (hereinafter, referred to as a "MEA") is formed. Then, a diffusion layer is joined to each of both surfaces of the MEA, whereby a membrane-electrode-diffusion layer assembly (hereinafter, referred to as a "MEGA") is formed, and a separator is then fitted to the MEGA on each of the anode side and the cathode side, whereby the PEFC as a module is produced.

However, the PEFC produced by this method has the following problems. When the cathode and the anode are joined to the surfaces of the thin-film electrolyte membrane, the porosity of the cathode and the anode tends to be reduced. Also, the electric power generation efficiency of the PEFC tends to be reduced due to contact resistance which occurs, for example, if the anode and the cathode are not sufficiently joined to the thin-film electrolyte membrane.

Accordingly, technologies for reducing contact resistance in a fuel cell have been proposed. For example, Japanese Patent Application Publication No. JP (A) 06-176771 discloses the following technology. In this technology, the minimum amount of ion-exchange resin required for joining an ion-exchange membrane and an electrode to each other is moisturized and joined to an electrode surface by forming an ion-conductive thin-film, whose glass-transition temperature is lower than that of the ion-exchange membrane, on one of or both of the surfaces of the ion-exchange membrane, whereby contact resistance is reduced.

However, the technology disclosed in Japanese Patent Application Publication No. JP (A) 06-176771 has the following problem. Although the contact resistance can be reduced, the production method for a fuel cell according to this technology becomes complicated, since multiple ion-exchange membranes need to be provided.

A PEFC module is usually produced by joining/fitting components such as an anode including a catalytic layer and a cathode including a catalytic layer and separators to an electrolyte membrane which has been formed to be a thin-film in advance. However, the electrolyte membrane of the PEFC produced by this method has problems that yield thereof is low, and/or that durability thereof is low. The PEFC produced by this method has another problem that relatively high contact resistance occurs in the fuel cell, and therefore the electric power generation efficiency tends to be reduced.

When the PEFC is produced by the above-mentioned conventional method, the catalytic layer of the anode and the catalytic layer of the cathode are joined to the thin-film electrolyte membrane. Examples of a typical method for joining the electrolyte membrane and the catalytic layers to each other include a method in which the catalytic layers are transcribed to the electrolyte membrane (hereinafter, this method will be referred to as a "transcription method"), and a method in which the catalytic layers are sprayed on the electrolyte membrane (hereinafter, this method will be referred to as a "spray coating method"). However, the transcription method has the following problem. When the catalytic layers are joined to the electrolyte membrane by the transcription method, the catalytic layers needs to be pressed to the thin-film electrolyte membrane. Accordingly, the porosity of the catalytic layers is reduced during pressing. Also, the spray coating method has the following problem. When the catalytic layers are joined to the electrolyte membrane by the spray coating method, although it is unlikely that porosity of the catalytic layers is reduced, the electrolyte may be damaged since a solvent is used during the spray coating.

SUMMARY OF THE INVENTION

The invention is made in light of the above-mentioned circumstances. It is an object of the invention to provide a production method for a fuel cell, which makes it possible to produce a fuel cell with reduced contact resistance without increasing the number of production processes.

According to an aspect of the invention, there is provided a production method for a fuel cell including an electrolyte, an anode which is provided on one of both sides of the electrolyte, a cathode which is provided on the other side of the electrolyte, and separators one of which is provided on an outer side of the anode and the other of which is provided on an outer side of the cathode. The production method includes a first process in which the anode and the cathode each of which includes at least a catalyst and an ion-exchange resin are produced; and a second process in which the molten electrolyte is provided between the anode and the cathode before being formed into a thin-film electrolyte.

With the above-mentioned production method for a fuel cell, since the molten electrolyte is provided between the anode and the cathode before being formed into a thin-film electrolyte, the production process is simplified. In addition, in the above-mentioned production method, when the anode and the cathode are joined to the electrolyte, the electrolyte is molten. The electrolyte becomes solid after the electrolyte contacts the anode and the cathode. Therefore, the joining condition between the electrolyte and the electrodes improves, as compared to a conventional fuel cell. As a result, it is possible to produce the fuel cell with contact resistance that occurs therein reduced.

In the above-mentioned production method for a fuel cell, the distance between the anode and the cathode may be set to a predetermined value by distance setting device in the second process. The "distance setting means" is not particularly limited, as long as the means can set the distance between the anode and the cathode to a predetermined value. Examples of the distance setting means include means for setting the distance to a predetermined value by adjusting pressure, and means for setting the distance to a predetermined value by using a so-called positioning member.

With this production method for a fuel cell, since the distance between the anode and the cathode is set to the predetermined value, the thickness of the electrolyte provided between the anode and the cathode can be set to a predetermined value. It is, therefore, possible to provide the production method for a fuel cell including the electrolyte having the predetermined thickness.

The above-mentioned production method for a fuel cell may include a process in which one of the separators is fitted to the anode and the other separator is fitted to the cathode after the first process is completed.

With this production method for a fuel cell, the separators are fitted to the anode and the cathode which are produced in the first process. Therefore, the separators one of which is fitted to the anode and the other of which is fitted to the cathode can be used as the positioning members. It is, therefore, possible to easily set the distance between the anode and the cathode to the predetermined value.

The above-mentioned production method for a fuel cell may include a process in which one of the separators is fitted to the anode and the other separator is fitted to the cathode after the second process is completed.

With this the production method for a fuel cell, a pressing process (a molten material press forming process) is performed until the distance between the anode and the cathode, which are opposed to each other with the electrolyte interposed therebetween, becomes the predetermined value. It is, therefore, possible to set the distance between the anode and the cathode to the predetermined value.

In the above-mentioned production method for a fuel cell, the molten electrolyte may be provided between the anode and the cathode by performing a molten material press forming process or a molten material injection molding process.

With this production method for a fuel cell, it is possible to produce the fuel cell with reduced contact resistance without increasing the number of production processes.

BRIEF DESCRIPTION OF THE DRAWINGS

The above-mentioned and other features, advantages, technical and industrial significance of this invention will be better understood by reading the following detailed description of preferred embodiments of the invention, when considered in connection with the accompanying drawings, in which.

DETAILED DESCRIPTION OF THE EXEMPLARY EMBODIMENTS

Hereafter, a production method for a fuel cell according to each embodiment of the invention will be described in detail with reference to the accompanying drawings.

Figure 4:
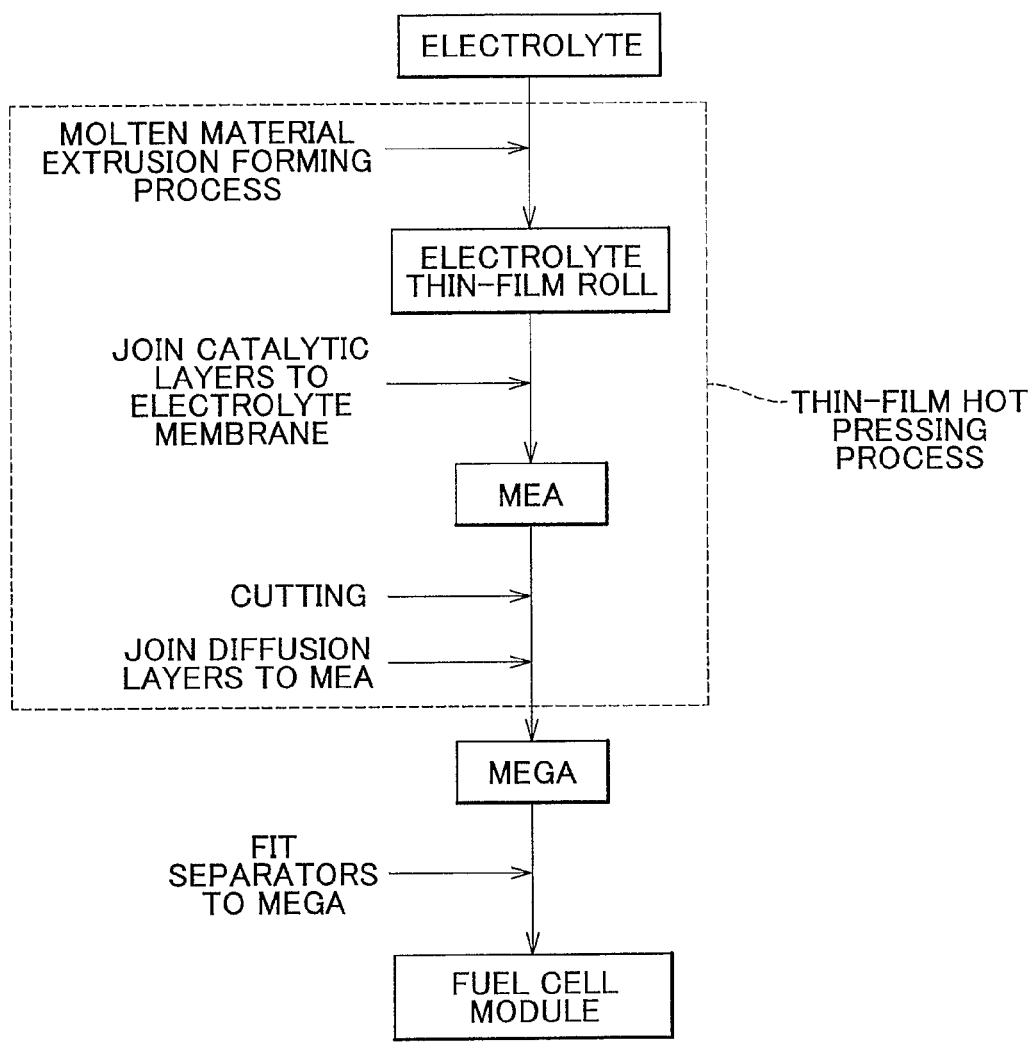
FIG. 4 is a view schematically showing a conventional production method for a fuel cell.

First, a conventional production method for a fuel cell will be described with reference to FIG. 4, for purpose of comparison with the production method according to invention. In the conventional method, a molten electrolyte is formed to be a thin-film electrolyte (hereinafter, referred to as an "electrolyte membrane", where appropriate) by a molten material injection molding process, and this electrolyte membrane is rolled by a roller, whereby a thin-film roll of an electrolyte is formed. Then, catalytic layers are joined to both surfaces of the electrolyte membrane by the transcription method or the spray coating method, whereby a MEA is formed. Then, diffusion layers are joined to both surfaces of the MEA, which has been cut into a predetermined size, whereby a membrane-electrode-diffusion layer assembly (hereinafter, referred to as a "MEGA") is formed. When separators are fitted to the MEGA, a fuel cell module is formed. In the following description, a process from the molten material injection molding process to the diffusion layer joining process in the conventional production method for a fuel cell will be referred to as a "thin-film hot pressing process". In FIG. 4, the process corresponding to the thin-film hot pressing process is surrounded by a dashed line.

Figure 1:
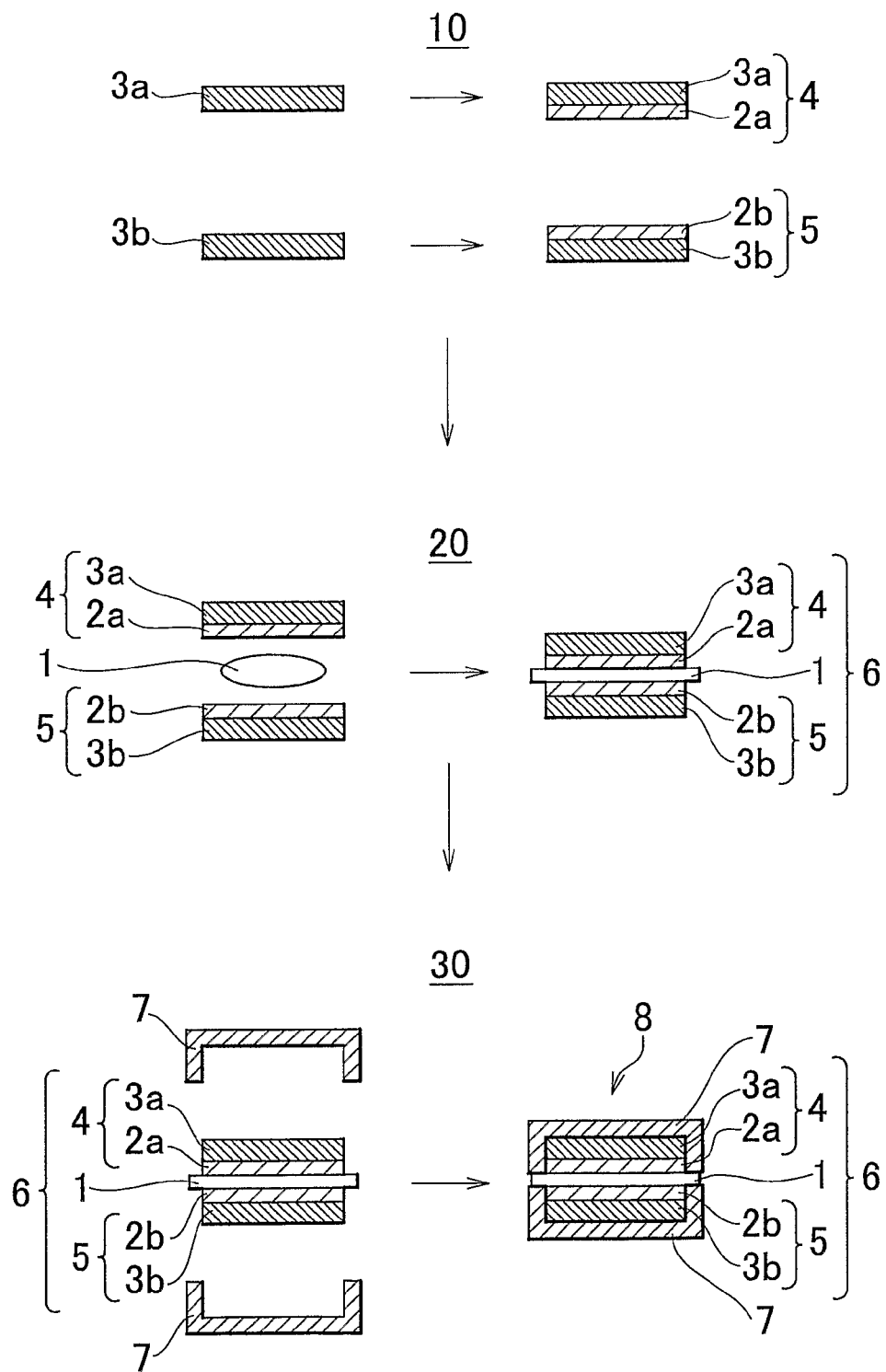
FIG. 1 is a view schematically showing a production method for a fuel cell according to a first embodiment of the invention.

FIG. 1 schematically shows a production method for a fuel cell according to a first embodiment of the invention. In a fuel cell produced by the production method shown in FIG. 1, each of an anode and a cathode, serving as electrodes, includes a catalytic layer and a diffusion layer, and the catalytic layer includes a catalyst and an ion-exchange resin. In the first embodiment, a fuel cell module is produced by a production method for a fuel cell, which includes a molten material press forming process.

As shown in FIG. 1, the production method for a fuel cell according to the first embodiment includes a first process 10 and a second process 20. In the first process 10, an anode 4 including a catalytic layer 2a and a diffusion layer 3a is formed by coating the diffusion layer 3a with the catalytic layer 2a; and a cathode 5 including a catalytic layer 2b and a diffusion layer 3b is formed by coating the diffusion layer 3b with the catalytic layer 2b. In the second process 20, a molten electrolyte 1 is provided between the anode 4 and the cathode 5 which are formed in the first process 10. In the second process 20 according to the first embodiment, the molten electrode 1 provided between the anode 4 and the cathode 5 is formed to be the electrolyte 1 having a predetermined thickness by being pressed until a distance between the anode 4 and the cathode 5, which are opposed to each other with the electrolyte 1 interposed therebetween, becomes a predetermined value (by performing the molten material press forming process). Namely, the distance between the anode 4 and the cathode 5 is set to the predetermined value by distance setting means. In the first embodiment, the "distance setting means" is not particularly limited, as long as the means can set the distance between the anode 4 and the cathode 5 to a predetermined value. Examples of the distance setting means include means for setting the distance to a predetermined value by adjusting pressure, and means for setting the distance to a predetermined value by using a so-called positioning member. The electrolyte 1, which has been formed so as to have the predetermined thickness in the above-mentioned manner, becomes a thin-film (solid) electrolyte 1 when the temperature thereof is decreased to be equal to or lower than the melting point thereof. In the production method according to the first embodiment, a MEGA 6 including the thin-film electrolyte 1 is formed in the second process 20. In a separator fitting process 30, one of separators 7, 7 is fitted to the MEGA 6, which is formed in the process 20 including the molten material press forming process, on one of both sides of the MEGA 6, and the other separator 7 is fitted to the MEGA 6 on the other side of the MEGA 6, whereby a fuel cell module 8 is produced.

With the production method according to the first embodiment shown in FIG. 1, since the molten electrolyte 1 is directly formed before being formed to be a thin-film, the thin-film hot pressing process is not provided, unlike the conventional production method. Therefore, with the production method according to the first embodiment, the production process can be simplified. Further, in the conventional thin-film hot pressing process, since the electrolyte membrane undergoes a thermal stress, a mechanical stress, or a chemical stress, the life of electrolyte membrane tends to be short. However, in the production method according to the first embodiment, since the hot pressing process is not performed, a stress placed on the electrolyte is reduced. According to the first embodiment of invention, it is, therefore, possible to provide the fuel cell including the long-life electrolyte membrane.

In the production method according to the first embodiment, the molten electrolyte 1, which can be present under a condition where the temperature is equal to or higher than the melting point, is pressed without performing the thin-film hot pressing process. Therefore, the electrolyte membrane, which is present under a condition where the temperature is lower than the melting point, and the catalytic layers are not pressed to each other. Usually, the electrolyte having the temperature equal to or higher than the melting point is softer than the electrolyte having the temperature lower than the melting point, and the molten electrolyte is softer than the electrolyte membrane. Therefore, the force which is applied from the molten electrolyte 1 to the catalytic layers 2a and 2b during pressing is smaller than the force which is applied from the electrolyte membrane to the catalytic layers. Therefore, with the production method according to the first embodiment, the porosity of the catalytic layers 2a and 2b is not reduced easily. In the MEA including the catalytic layers that have undergone the thin-film hot pressing process, porosity of the catalytic layers is reduced by the force applied from the electrolyte membrane to the catalytic layers during the thin-film hot pressing process. As a result, blockage of water and gas is caused easily, resulting in flooding, and the robustness of the MEA tends to be low. In contrast to this, in the MEA included in the fuel cell 8 produced by the production method according to the first embodiment, since the catalytic layers 2a and 2b whose porosity can be maintained at an appropriate level are included in the MEA, flooding does not occur easily, and the robustness of the MEA is high. Therefore, with the production method according to the first embodiment, it is possible to produce the fuel cell 8 having the MEA in which flooding does not occur easily, and which has high robustness. If the catalytic layers have appropriate porosity, reaction gas can easily flow in the catalytic layers, and many catalysts present in the catalytic layers can contribute to the reaction. Therefore, the electric power generation efficiency of the fuel cell including the catalytic layers having excellent porosity is higher than the electric power generation efficiency of the fuel cell including the catalytic layers having reduced porosity. Therefore, producing the fuel cell by the production method according to the first embodiment makes it possible to maintain good porosity of the catalytic layers 2a and 2b. As a result, the fuel cell having excellent electric power generation efficiency can be provided.

In addition, with the production method according to the first embodiment, since the molten electrolyte 1 contacts the catalytic layers 2a and 2b, the surfaces of the molten electrolyte 1 are formed along the asperities on the surfaces of the catalytic layers 2a and 2b. Since the electrolyte 1 having the thus formed surfaces is cooled and then joined to the catalytic layers 2a and 2b, the joining condition between the electrolyte 1 and the catalytic layers 2a and 2b is good. As a result, the contact resistance caused between the electrolyte 1 and the catalytic layers 2a and 2b can be reduced. Therefore, with the production method according to the first embodiment, it is possible to provide the fuel cell with reduced contact resistance. In the production method according to the first embodiment of the invention, the joining condition between the electrolyte 1 and the catalytic layers 2a and 2b can be adjusted by adjusting the viscosity of the electrolyte 1 and the pressure applied during the molten material press process, and the viscosity of the electrolyte 1 changes based on the temperature of the electrolyte 1. Preferably, the temperature and the pressure during molten material press process are appropriately adjusted in the production method according to the first embodiment. In this manner, it is possible to provide the fuel cell with further reduced contact resistance.

In addition, in the production method according to the first embodiment, the molten electrolyte 1, and the anode 4 and the cathode 5 are pressed each other, and a solvent, that is used in the spray coating method, is not used during pressing. Therefore, with the production method according to the first production method, damage given to the electrolyte can be reduced, and therefore, durability of the electrolyte can be improved.

In the molten material press forming process in the production method according to the first embodiment, preferably, the surface-roughness of the catalytic layers 2a and 2b, which contact the molten electrolyte 1, is sufficiently adjusted in advance in order to prevent a short circuit during the press forming process. Performing the molten material press forming process by using the catalytic layers 2a and 2b whose surface roughness has been adjusted in advance makes it possible to produce the fuel cell including the electrolyte 1 having good a yield.

The molten material press forming process in the production method according to the first embodiment is not particularly limited, as long as the MEGA can be formed by pressing the molten electrolyte, and the anode and the cathode, each of which includes the diffusion layer and the catalytic layer, into shapes. An example of the molten material press forming process in the production method according to the first embodiment is shown in FIG. 1. In this process, the anode 4 and the cathode 5, and the molten electrolyte 1 are pressed into shapes. The anode 4 is formed by coating the diffusion layer 3a with the catalytic layer 2a, and the cathode 5 is formed by coating the diffusion layer 3b with the catalytic layer 2b. Each of the diffusion layers 3a and 3b has been cut into a size appropriate for forming the fuel cell module 8 in advance.

Figure 2:
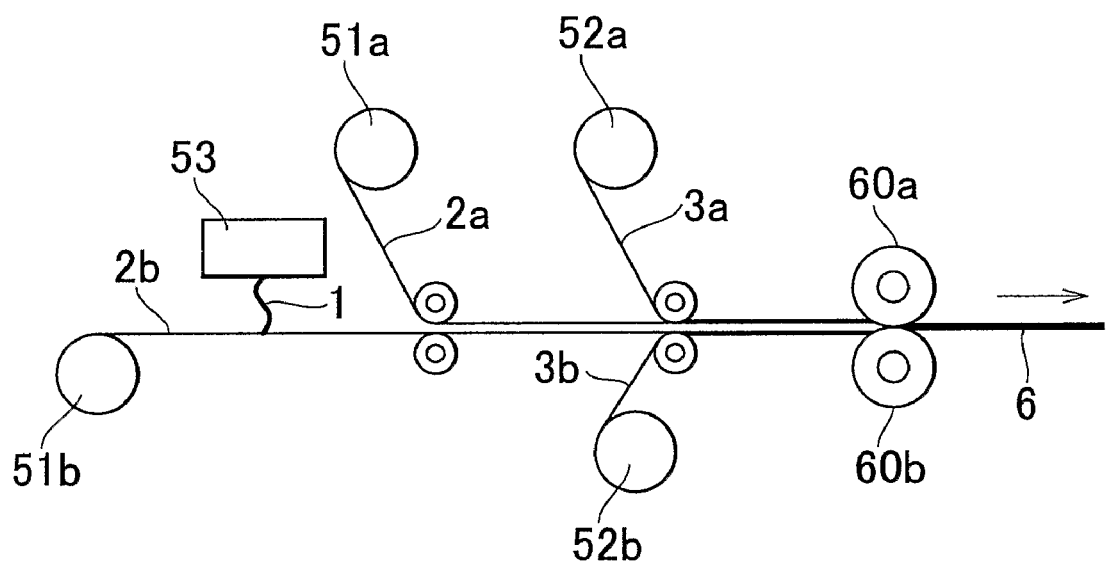
FIG. 2 is a view schematically showing another method of a molten material press process in the first embodiment.

In the molten material press forming process in the production method according to the first embodiment, the MEGA may be formed by continuously performing the molten material press forming process. In this process, the molten electrolyte, and the anode and the cathode, each of which includes the diffusion layer and the catalytic layer, are pressed into shapes. FIG. 2 schematically shows the continuous molten material press forming process which may be included in the production method according to the first embodiment. In a continuous molten material press forming process 21 shown in FIG. 2, the molten electrolyte 1 supplied from an electrolyte tank 53 is placed on the upper surface of the catalytic layer 2b supplied from a catalytic layer supply roller 51b. Then, the catalytic layer 2a supplied from a catalytic layer supply roller 51a and the diffusion layer 3a supplied from a diffusion layer supply roller 52a are placed on the molten electrolyte 1. The diffusion layer 3b supplied from a diffusion layer supply roller 52b is placed on the lower surface of the catalytic layer 2b supplied from the catalytic layer supply roller 51b, whereby the molten electrolyte 1 is placed between the anode and the cathode each of which includes the catalytic layer and the diffusion layer. The molten electrolyte 1 placed between the anode and the cathode is then pressed by roll pressers 60a and 60b from both sides, whereby the MEGA 6 is formed. When the MEGA 6 is formed by the molten material press forming process 21, the MEGA 6 is cut into a size such that the MEGA can be provided in the fuel cell module. Then, the separators are fitted to the MEGA 6 in the separator fitting process 30, whereby the fuel cell module 8 is produced. Note that the arrow in FIG. 2 shows the direction in which the MEGA is moved.

Figure 3:
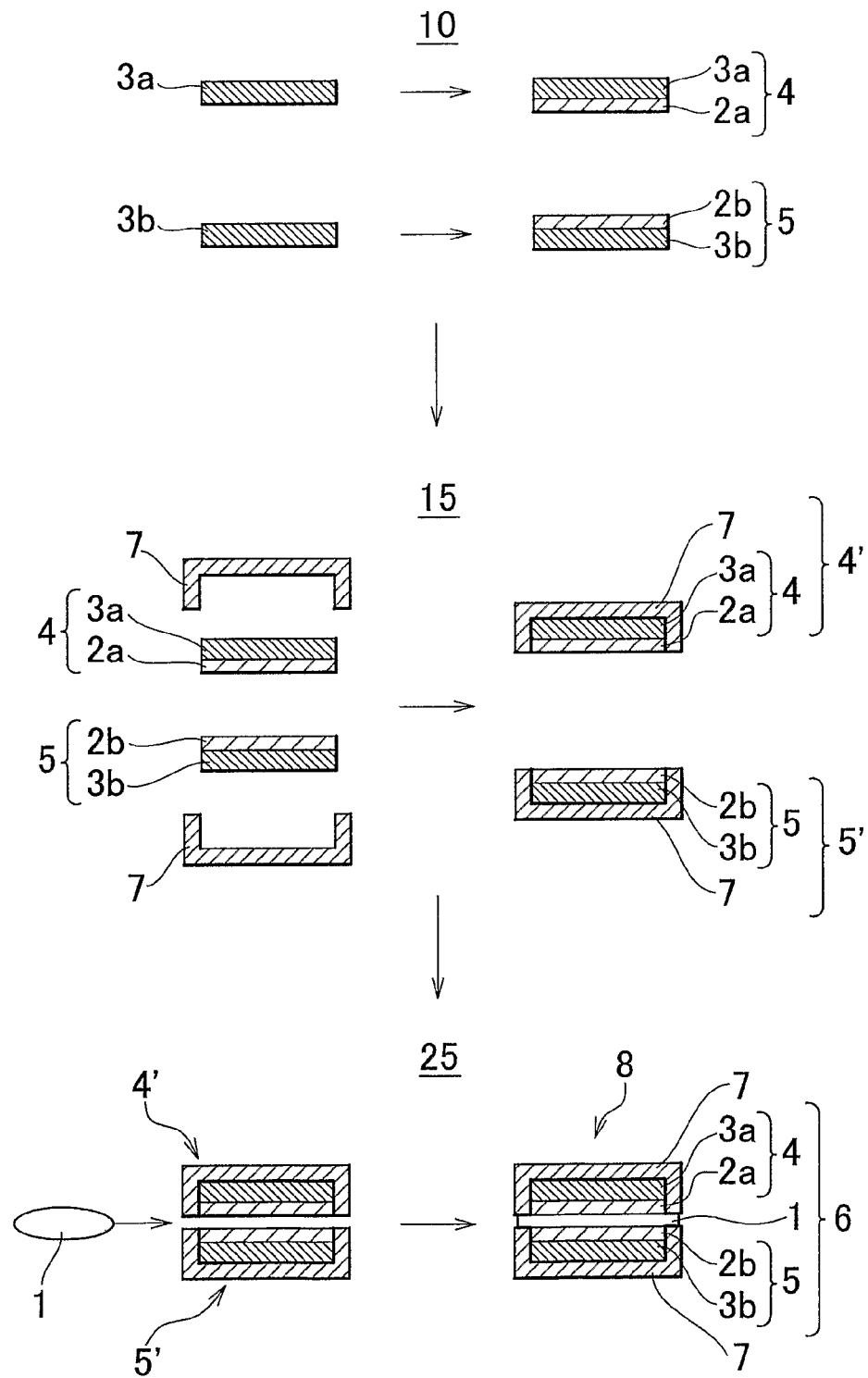
FIG. 3 is a view schematically showing a production method for a fuel cell according to a second embodiment of the invention.

FIG. 3 is a view schematically showing a production method for a fuel cell according to a second embodiment of the invention. In a fuel cell produced by the production method shown in FIG. 3, each of the anode and the cathode, serving as the electrodes, includes the catalytic layer and the diffusion layer, and the catalytic layer includes the catalyst and the ion-exchange resin. In the second embodiment, the fuel cell module is produced by the production method for the fuel cell, which includes the molten material injection molding process.

As shown in FIG. 3, the fuel cell production method according to the second embodiment of the invention includes the first process 10, a separator fitting process 15, and a second process 25. In the first process 10 according to the second embodiment, the anode 4 including the catalytic layer 2a and the diffusion layer 3a is formed by coating the diffusion layer 3a with the catalytic layer 2a; and the cathode 5 including the catalytic layer 2b and the diffusion layer 3b is formed by coating the diffusion layer 3b with the catalytic layer 2b. In the separator fitting process 15, one of the separators 7, 7 is fitted to the anode 4 produced in the process 10, and the other separator 7 is fitted to the cathode 5 produced in the process 10, whereby an anode 4' with the separator and the cathode 5' with the separator are formed. In the second process 25 according to the second embodiment, the molten electrolyte 1 is placed between the anode 4' with the separator and the cathode 5' with the separator whose positions are set such that a predetermined distance is reserved therebetween. Then, the electrolyte 1 is cooled into the thin-film electrolyte 1, whereby the fuel cell module 8 including the MEGA 6 is produced. The distance between the anode 4 and the cathode 5 is set to the predetermined value by the distance setting means. As in the first embodiment, the "distance setting means" is not particularly limited, as long as the means can set the distance between the anode 4 and the cathode 5 to a predetermined value. Examples of the distance setting means include means for setting the distance to a predetermined value by adjusting pressure, and means for setting the distance to a predetermined value by using a so-called positioning member.

As in the production method according to the first embodiment of the invention, in the production method according to the second embodiment of the invention shown in FIG. 3, since the molten electrolyte 1 is directly formed before being formed into the thin-film, the thin-film hot pressing process is not provided, unlike the conventional production methods. With the production method according to the second embodiment, it is, therefore, possible to provide the fuel cell with stable and good porosity, reduced contact resistance, and improved durability.

In addition, in the production method according to the second embodiment, after the anode 4' with the separator and the cathode 5' with the separator are produced, the molten electrode 1 is placed between the anode 4' and the cathode 5' which are provided with the predetermined distance reserved therebetween. Accordingly, with the production method according to the second embodiment, in addition to the effects obtained by the production method according to the first embodiment, the following effects can be obtained. The dimensional accuracy of the electrolyte 1 can be further improved, and the production processes can be further simplified.

For the sake of convenience, in the production method for the fuel cell according to each of the first and the second embodiments of the invention, the anode and the cathode each of which includes the catalytic layer and the diffusion layer are used. However, the anode and the cathode included in the fuel cell produced by the production method according to the invention are not limited to the anode and the cathode used in the first and the second embodiments, as long as each of the anode and the cathode includes a catalyst and an ion-exchange resin.

The invention claimed is:

1. A production method for a fuel cell including an electrolyte, an anode which is provided on one of both sides of the electrolyte, a cathode which is provided on the other side of the electrolyte, and separators one of which is provided on an outer side of the anode and the other of which is provided on an outer side of the cathode, comprising:

a first process in which the anode and the cathode each of which includes at least a catalyst and an ion-exchange resin are produced; and a second process in which an externally molten electrolyte is provided and pressed in a molten state between the anode and the cathode before being formed into a thin-film electrolyte.

2. The production method for a fuel cell according to claim 1, wherein a distance between the anode and the cathode is set to a predetermined value by distance setting device in the second process.

3. The production method for a fuel cell according to claim 1, further comprising:

a separator fitting process in which one of the separators is fitted to the anode and the other separator is fitted to the cathode after the first process is completed.

4. The production method for a fuel cell according to claim 1, further comprising:
a separator fitting process in which one of the separators is fitted to the anode and the other separator is fitted to the cathode after the second process is completed.

5. The production method for a fuel cell according to claim 1, wherein the molten electrolyte is provided between the anode and the cathode by performing a molten material press forming process or a molten material injection molding process.

* * * * *